United States Patent [19]
Toll

[11] 3,941,159
[45] Mar. 2, 1976

[54] INSULATION ASSEMBLY FOR A TUBULAR CONDUIT PIPE

[76] Inventor: Wolcott Toll, R.D. 3 Pocono Road, Newtown, Conn. 06470

[22] Filed: Oct. 31, 1974

[21] Appl. No.: 519,649

[52] U.S. Cl. ............. 138/147; 24/204; 24/DIG. 18; 150/52 R; 428/81; 428/100; 428/102
[51] Int. Cl.² F16L 9/14; B65D 65/08; A44B 13/00; B32B 7/08
[58] Field of Search .......... 161/44, 48, 50; 138/149, 138/168, 169, 147; 24/204, DIG. 18; 150/52 R; 428/81, 100, 102

[56] References Cited
UNITED STATES PATENTS

| | | |
|---|---|---|
| 1,827,035 | 10/1931 | Mottweiler et al. ................ 138/147 |
| 2,756,172 | 7/1956 | Kidd ................................... 138/147 |
| 3,000,433 | 9/1961 | Kemper .......................... 138/149 X |
| 3,143,154 | 8/1964 | Best ................................. 150/52 R |
| 3,491,800 | 1/1970 | Holton ............................. 24/204 X |
| 3,583,057 | 6/1971 | Kolozsvary ....................... 24/204 X |

*Primary Examiner*—Philip Dier
*Attorney, Agent, or Firm*—Robert G. McMorrow

[57] ABSTRACT

A length of insulation material is wrapped about an article to be insulated. A layer of fabric is affixed to the insulation material, one end of the fabric being of a length to overlap the opposite end thereof. Fastening means on the overlapped ends of the fabric provide a secure connection of the fabric about the insulation material.

2 Claims, 2 Drawing Figures

INSULATION ASSEMBLY FOR A TUBULAR CONDUIT PIPE

BACKGROUND OF THE INVENTION

1. Field of the Invention

This invention pertains to insulation for pipes and the like, and particularly to means for application and maintenance in position of the insulation.

2. Statement of Prior Art

It has been heretofore proposed to apply insulation coverings to pipes and the like in such manner that insulating material has a flexible connector encased thereabout. Various uses for fastening material with hook-like projections have also been advanced. Representative prior patents in these fields include the following:

| Patent No. | Patentee | Issued |
|---|---|---|
| 1,646,388 | Bullard | Oct. 25, 1927 |
| 2,160,009 | Walker | May 30, 1939 |
| 2,522,072 | Tierney | Sept. 12, 1950 |
| 2,825,673 | Tschappu | March 4, 1958 |
| 2,962,402 | Sweeney | Nov. 29, 1960 |
| 3,086,529 | Munz et al | Apr. 23, 1963 |
| 3,160,143 | Gray | Dec. 8, 1964 |
| 3,233,699 | Plummer | Feb. 8, 1966 |
| 3,242,576 | Wheeler | March 29, 1966 |
| 3,415,288 | Marshack | Dec. 10, 1968 |
| 3,455,336 | Ellis | July 15, 1969 |
| 3,486,534 | Terkel et al | Dec. 30, 1969 |
| 3,563,825 | Segura et al | Feb. 16, 1971 |
| 3,583,424 | Bryant | June 8, 1971 |
| 3,614,967 | Royston | Oct. 26, 1971 |
| 3,768,523 | Schroeder | Oct. 30, 1973 |

SUMMARY OF THE INVENTION

The insulation covering provided by this invention is usable in numerous environments and is principally directed to the provision of an insulation material which is easily and quickly applied, and one which is readily adapted by virtue of its inherent flexibility to use in those situations where irregular forms are to be insulated.

The insulating material is applied as a one man operation, and this effects substantial reduction in labor costs by comparison to prior art methods. Moreover, the material may be removed after application without damage and subsequently re-applied or re-used.

Various compressible or semi-rigid insulation materials are employed, and a reinforced fabric covering is supplied which may be decorative in nature as well as providing a protective covering for the insulation.

The material is water and vapor proof, corrosion resistant, and flame retardant. It requires no adhesive or banding. The fabric covering may be supplied in various colors if desired, to permit color identification of different pipeline services. For example, a cold water supply line may be one color, a hot water supply line another color, a steam condensate return a third color, an air supply a fourth color, and the like. By providing the proper color for each pipeline or duct at the outset, the user saves the labor and material costs involved in separately painting or otherwise color-coding such services after installing the insulation. The two-step procedure of first insulating and then color-coding (which is now common practice) is thereby eliminated.

Other and further objects and advantages of the invention will become apparent to those skilled in the art from a consideration of the following specification when read in conjunction with the annexed drawing.

Figure 1:
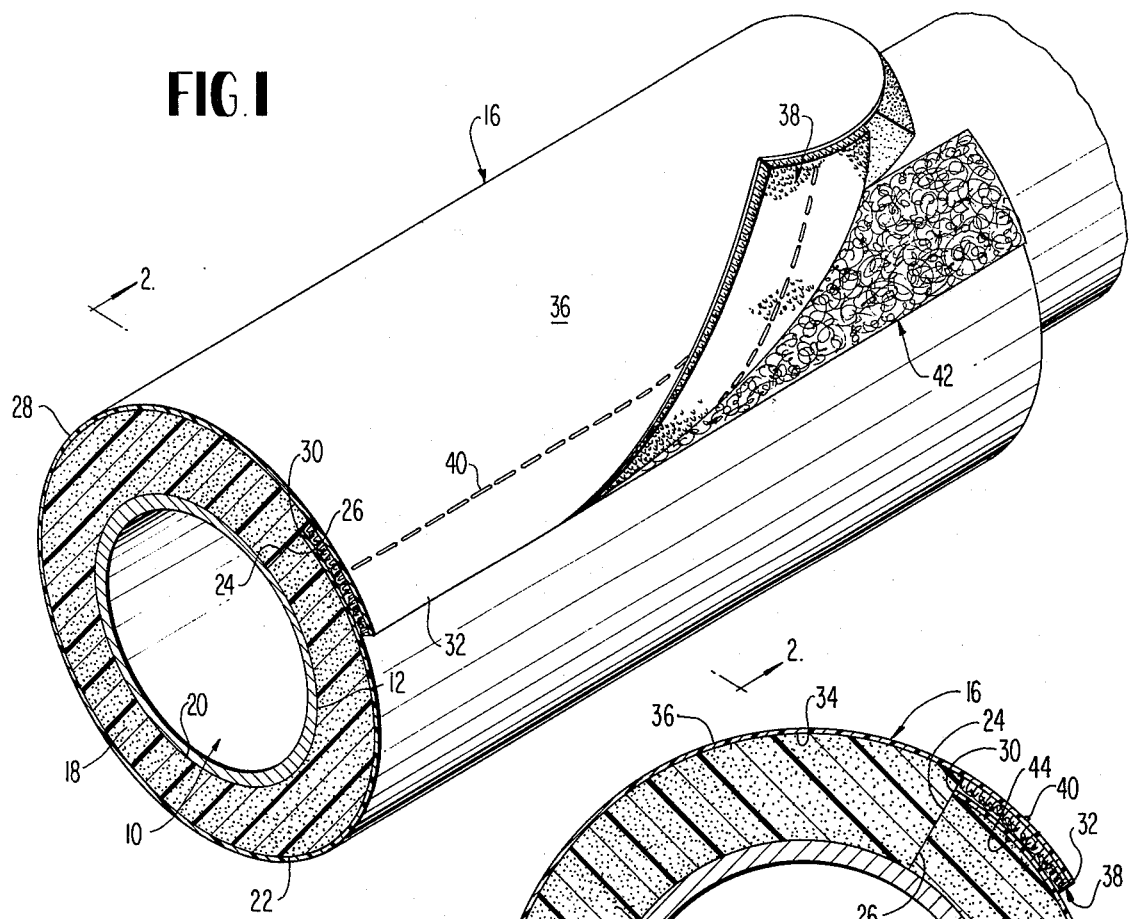
FIG. 1 is a perspective view of a section of pipe with an insulation covering according to this invention in place thereon.
Figure 2:
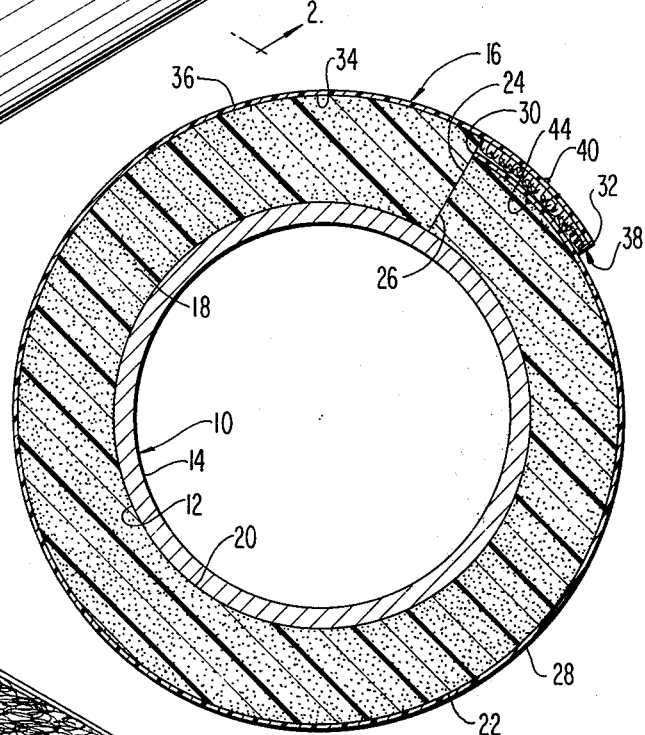
FIG. 2 is an enlarged transverse sectional view taken on line 2—2 of FIG. 1, looking in the direction of the arrows.
Figure 3:
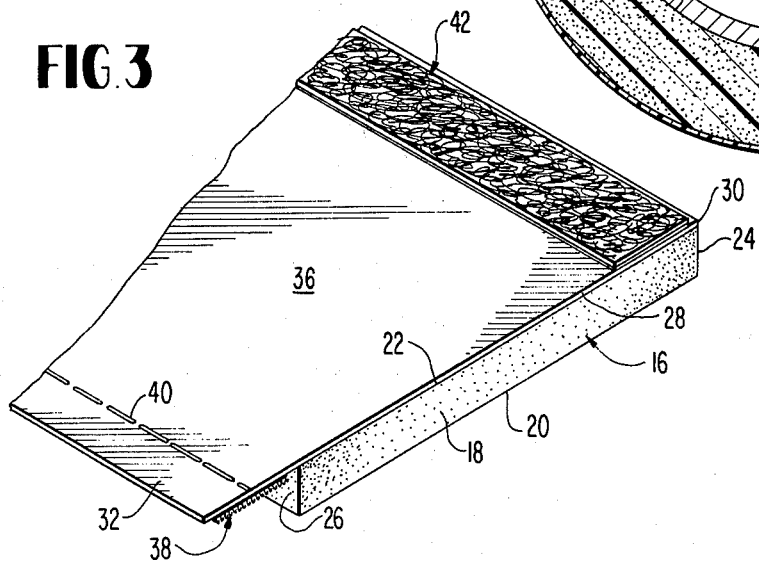
FIG. 3 is another perspective view of a section of insulation material hereof prior to application.

DESCRIPTION OF THE PREFERRED EMBODIMENT:

Referring to the drawing in more detail a section of pipe to be insulated is shown in FIGS. 1 and 2 and is there identified by reference numeral 10. The pipe 10 is tubular and has an outer surface 12 and an inner surface 14. This pipe is shown by way of illustration only, and it will be understood that different shapes, sizes and forms of materials to be insulated may be covered by appropriate modification of the insulation material.

The insulation assembly 16 hereof comprises a length of compressible insulation material 18 formed of urethane foam, fiber glass, foam glass or other suitable materials. The material 18 has inside and outside surfaces 20, 22, and first and second side edges 24 and 26.

Adhesively or otherwise fixedly secured to the outside surface of the insulation material is a layer 28 of fabric. The fabric layer is preferably water and vapor proof, and is also flame retardant. It may also be anticorrosive, and provided in different colors or otherwise decorated. One material found suitable for this purpose is reinforced polyvinyl chloride (PVC). The layer 28 of fabric has an interior end 30 coincident with the first side edge 24 of the insulation material, and an exterior end 32 which projects outwardly a substantial distance from the second side edge 26 of the insulation material. The fabric layer 28 has an inner surface 34 and an opposite outer surface 36.

Fixedly secured to the inner surface 34 of the layer 28 and extending along the entire length of the exterior end 32 thereof is a strip of fastening material 38. Such material includes a series of minute hook-like projections extending therefrom, and is adhesively bonded in place. A typical example of material suitable for this purpose is that sold under the trademarks VELSTIK and VELCRO. A single line of nylon stitching 40 extends through the fastening material and through the fabric. This material is also secured as by mastic bond, and may be cut therefore at any necessary location to achieve a proper length for the complete assembly.

A strip 42 of hirsute or felt-like material is similarly applied as by adhesive and a line of stitching 44 to the fabric. The strip 42 extends on the outer surface of the fabric along the full extent of the interior end thereof.

In the application of the insulation to the pipe, the material 18 is placed with its inside surface 20 against the outer surface 12 of the pipe, and is dimensioned such that the first and second side edges abut one another. This places the exterior end 32 of the fabric layer in overlying relation relative to the interior end 30. The VELCRO fastening means 38 contacts the strip 42 resulting in a self-adhesion and in securing the insulation in place in encircling relation about the pipe 12. It will be observed that this may create compression of the insulation material below the connection point but that the entire assembly is substantially round in appearance.

As indicated above, the fabric layer has full depth color which runs throughout the thickness thereof. This construction permits the user a wide selection of durable colors for the outer jacket of the assembly. A wide selection of colors is very desirable in that it permits the user to color-identify the different pipelines and the like, so that distinction may be made between the lines and determination may be made for lines carrying different substances. Such color-coding is also helpful to distinguish between lines of different temperatures, different pressures or the like and to identify different parts of the same service such as the supply portion and the return lines. Briefly, this construction permits the user to select in advance the colors for each line and thus achieve the final color-coding desired in a single one-step installation procedure instead of following the present two-step practice which requires a separate painting or color-marking operation after the pipe insulation has been installed. Thus, the single-step installation results in the saving of both labor and material and a more durable color-coding.

I claim:

1. An insulation assembly for a tubular conduit pipe having an outer surface, the insulation assembly comprising:

a length of compressible insulation material having inside and outside surfaces and having first and second side edges;

a layer of moisture and vapor impervious fabric coextensive in length with the length of compressible insulation material, the fabric having inner and outer surfaces;

the layer of fabric being of a width exceeding that of the insulation material;

the layer of fabric having an interior end coincident with the first side edge of the insulation material, and having an exterior end which extends outwardly of the second side edge of the insulation material;

a strip of fastening material having a series of minute hook-like projections thereon fixedly secured to the inner surface of the fabric on said interior end thereof;

a strip of hirsute material fixedly secured to the outer surface of the fabric on said interior end thereof; and the inside surface of the insulation material contacting the outer surface of the conduit pipe and being of a width from side-to-side such that its respective edges contact one another and the strips of fastening material and hirsute material being radially aligned when the edges are in contact, said strips being adherent to one another.

2. The invention of claim 1, and:

a line of stitching extending through said fastening means having said hook-like projections and said exterior end of said fabric.

* * * * *

UNITED STATES PATENT AND TRADEMARK OFFICE
CERTIFICATE OF CORRECTION

PATENT NO. : 3,941,159

DATED : March 2, 1976

INVENTOR(S) : Wolcott Toll

It is certified that error appears in the above-identified patent and that said Letters Patent is hereby corrected as shown below:

Column 4, Line 15, delete "interior" and insert

--exterior--.

Signed and Sealed this

Twentieth Day of November, 1990

*Attest:*

HARRY F. MANBECK, JR.

*Attesting Officer*  *Commissioner of Patents and Trademarks*